United States Patent
Chandra

(10) Patent No.: US 8,254,490 B2
(45) Date of Patent: Aug. 28, 2012

(54) REDUCING TRANSMIT SIGNAL COMPONENTS OF A RECEIVE SIGNAL OF A TRANSCEIVER USING A SHARED DAC ARCHITECTURE

(75) Inventor: Gaurav Chandra, Santa Clara, CA (US)

(73) Assignee: PLX Technology, Inc., Sunnyvale, CA (US)

( * ) Notice: Subject to any disclaimer, the term of this patent is extended or adjusted under 35 U.S.C. 154(b) by 284 days.

(21) Appl. No.: 12/839,254

(22) Filed: Jul. 19, 2010

(65) Prior Publication Data

US 2012/0014419 A1    Jan. 19, 2012

(51) Int. Cl.
H04B 15/00 (2006.01)

(52) U.S. Cl. ........ 375/285; 375/219; 375/220; 375/221; 375/232; 375/229; 370/201; 370/286; 370/289; 370/290; 370/291

(58) Field of Classification Search .................. 375/285, 375/219, 220, 221, 229, 232; 370/201, 286, 370/289, 290, 291
See application file for complete search history.

(56) References Cited

U.S. PATENT DOCUMENTS

| | | | |
|---|---|---|---|
| 4,928,308 A * | 5/1990 | Roessler | 379/406.08 |
| 5,166,924 A | 11/1992 | Moose | |
| 5,222,084 A * | 6/1993 | Takahashi | 370/290 |
| 5,787,133 A | 7/1998 | Chow et al. | |
| 6,856,191 B2 | 2/2005 | Bartuni | |
| 6,934,386 B2 | 8/2005 | Kim | |
| 6,946,983 B2 | 9/2005 | Andersson et al. | |
| 2003/0206579 A1 | 11/2003 | Bryant | |
| 2004/0116160 A1 * | 6/2004 | Deas et al. | 455/570 |
| 2005/0220185 A1 | 1/2005 | Dowling | |
| 2006/0280234 A1 * | 12/2006 | Gupta | 375/219 |
| 2008/0233903 A1 * | 9/2008 | Dabiri et al. | 455/115.1 |
| 2009/0073903 A1 * | 3/2009 | Clara et al. | 370/286 |
| 2011/0310936 A1 * | 12/2011 | Malkin et al. | 375/219 |

* cited by examiner

*Primary Examiner* — Phuong Phu
(74) *Attorney, Agent, or Firm* — Brian R. Short

(57) ABSTRACT

Embodiments of a method and apparatus of reducing transmit signal components of a receive signal of a transceiver are disclosed. One embodiment of an apparatus includes a transceiver that simultaneously transmits a transmit signal and receives a receive signal. The transceiver includes a transmit DAC that generates the transmit signal based on a transmit digital signal stream. The transmit DAC includes a plurality of transmit DAC circuit elements, and a plurality of transmit DAC switches that control which of the plurality of transmit DAC circuit elements contribute to generating the transmit signal. The transceiver additionally includes an echo cancellation DAC that generates an echo cancellation signal based on the transmit digital signal stream. The echo cancellation DAC includes a plurality of echo cancellation DAC circuit elements, and a plurality of echo cancellation DAC switches that control which of the plurality of echo cancellation DAC circuit elements contribute to generating the echo cancellation signal. A data controller receives the transmit digital signal stream, and controls both the plurality of transmit DAC switches and the plurality of echo cancellation DAC switches. A canceller (summer) cancels at least a portion of the receive signal by summing the echo cancellation signal with the receive signal.

26 Claims, 9 Drawing Sheets

Generating the transmit signal, with a first DAC, based on a transmit digital signal steam, the first DAC comprising a plurality of first DAC circuit elements, and a plurality of first DAC switches that control which of the plurality of first DAC circuit elements contribute to generating the transmit signal
810

Generating an echo cancellation signal, with a second DAC, based on the transmit digital signal steam, the second DAC comprising a plurality of second DAC circuit elements, and a plurality of second DAC switches that control which of the plurality of second DAC circuit elements contribute to generating the echo cancellation signal
820

A data controller receiving the transmit digital signal steam, and controlling both the plurality of first DAC switches and the plurality of second DAC switches
830

Cancelling at least a portion of the receive signal by summing the echo cancellation signal with the receive signal
840

REDUCING TRANSMIT SIGNAL COMPONENTS OF A RECEIVE SIGNAL OF A TRANSCEIVER USING A SHARED DAC ARCHITECTURE

FIELD OF THE INVENTION

The invention relates generally to network communications. More particularly, the invention relates to methods and apparatuses for reducing transmit signal components of a receive signal of a transceiver using a shared DAC (Digital to Analog Converter) architecture.

BACKGROUND OF THE INVENTION

High-speed networks are continually evolving. The evolution includes a continuing advancement in the operational speed of the networks. The network implementation of choice that has emerged is Ethernet networks physically connected over unshielded twisted pair wiring. Ethernet in its 10/100BASE-T form is one of the most prevalent high speed LANs (local area network) for providing connectivity between personal computers, workstations and servers.

High-speed LAN technologies include 100BASE-T (Fast Ethernet) and 1000BASE-T (Gigabit Ethernet). Fast Ethernet technology has provided a smooth evolution from 10 Megabits per second (Mbps) performance of 10BASE-T to the 100 Mbps performance of 100BASE-T. Gigabit Ethernet provides 1 Gigabit per second (Gbps) bandwidth with essentially the simplicity of Ethernet. There is a desire to increase operating performance of Ethernet to even greater data rates.

FIG. 1 shows a block diagram of a pair of Ethernet transceivers communicating over a bi-directional transmission channel, according to the prior art. An exemplary transmission channel includes four pairs of copper wire 112, 114, 116, 118. The transceiver pair can be referred to as link partners, and includes a first Ethernet port 100 and a second Ethernet port 105. Both of the Ethernet ports 100, 105 include four transmitter $T_x$, receiver $R_x$, and I/O buffering sections corresponding to each of the pairs of copper wires 112, 114, 116, 118.

An implementation of high speed Ethernet networks includes simultaneous, full bandwidth transmission, in both directions (termed full duplex), within a selected frequency band. When configured to transmit in full duplex mode, Ethernet line cards are generally required to have transmitter and receiver sections of an Ethernet transceiver connected to each other in a parallel configuration to allow both the transmitter and receiver sections to be connected to the same twisted wiring pair for each of four pairs.

One result of full duplex transmission is that the transmit signals share the same transmission channel as the receive signals, and some of the transmit signal processing shares at least some electronic circuitry with receive processing. Non-linearities of transmit signals can be generated within the transmitter section of the transceiver, and at least some of the non-linearities can be imposed onto the receive signal. The result is distortion of the receive signal.

Full duplex transmission can result in at least a portion of the transmit signal being coupled back into the receive signal. The portion of the transmit signal that couples back is referred to as an echo signal. Linear portions of the echo signal can be canceled by subtracting an approximate echo signal from the received signal. Generation of the echo cancellation signal, and cancellation process can also introduce non-linearities which can be imposed on the receive signal. The result is additional distortion of the receive signal.

Additionally, the receive signal itself can introduce non-linearities. For example, the receiver section typically includes an ADC which converts the analog receive signal into a digital stream. This ADC can introduce receive signal non-linearity.

It is desirable to have an apparatus and method of reducing transmit signal components of a receive signal of a transceiver.

SUMMARY OF THE INVENTION

An embodiment includes a transceiver that simultaneously transmits a transmit signal and receives a receive signal. The transceiver includes a transmit DAC that generates the transmit signal based on a transmit digital signal stream. The transmit DAC includes a plurality of transmit DAC circuit elements, and a plurality of transmit DAC switches that control which of the plurality of transmit DAC circuit elements contribute to generating the transmit signal. The transceiver additionally includes an echo cancellation DAC that generates an echo cancellation signal based on the transmit digital signal stream. The echo cancellation DAC includes a plurality of echo cancellation DAC circuit elements, and a plurality of echo cancellation DAC switches that control which of the plurality of echo cancellation DAC circuit elements contribute to generating the echo cancellation signal. A data controller receives the transmit digital signal stream, and controls both the plurality of transmit DAC switches and the plurality of echo cancellation DAC switches. A canceller (summer) cancels at least a portion of the receive signal by summing the echo cancellation signal with the receive signal.

Another embodiment includes a method of a transceiver simultaneously transmitting a transmit signal and receiving a receive signal. The method includes generating the transmit signal with a first DAC based on a transmit digital signal stream. The first DAC includes a plurality of first DAC circuit elements, and a plurality of first DAC switches that control which of the plurality of first DAC circuit elements contribute to generating the transmit signal. An echo cancellation signal is generated with a second DAC based on the transmit digital signal stream. The second DAC includes a plurality of second DAC circuit elements, and a plurality of second DAC switches that control which of the plurality of second DAC circuit elements contribute to generating the echo cancellation signal. A data controller that receives the transmit digital signal stream, and controls both the plurality of first DAC switches and the plurality of second DAC switches. At least a portion of the receive signal is canceled by summing the echo cancellation signal with the receive signal.

Other aspects and advantages of the described embodiments will become apparent from the following detailed description, taken in conjunction with the accompanying drawings, illustrating by way of example the principles of the described embodiments.

BRIEF DESCRIPTION OF THE DRAWINGS

The described embodiments are readily understood by the following detailed description in conjunction with the accompanying drawings, wherein like reference numerals designate like structural elements, and in which:

FIG. 8 is a flow chart that includes an example of steps of one method of a transceiver simultaneously transmitting a transmit signal and receiving a receive signal.

DETAILED DESCRIPTION

Figure 1:
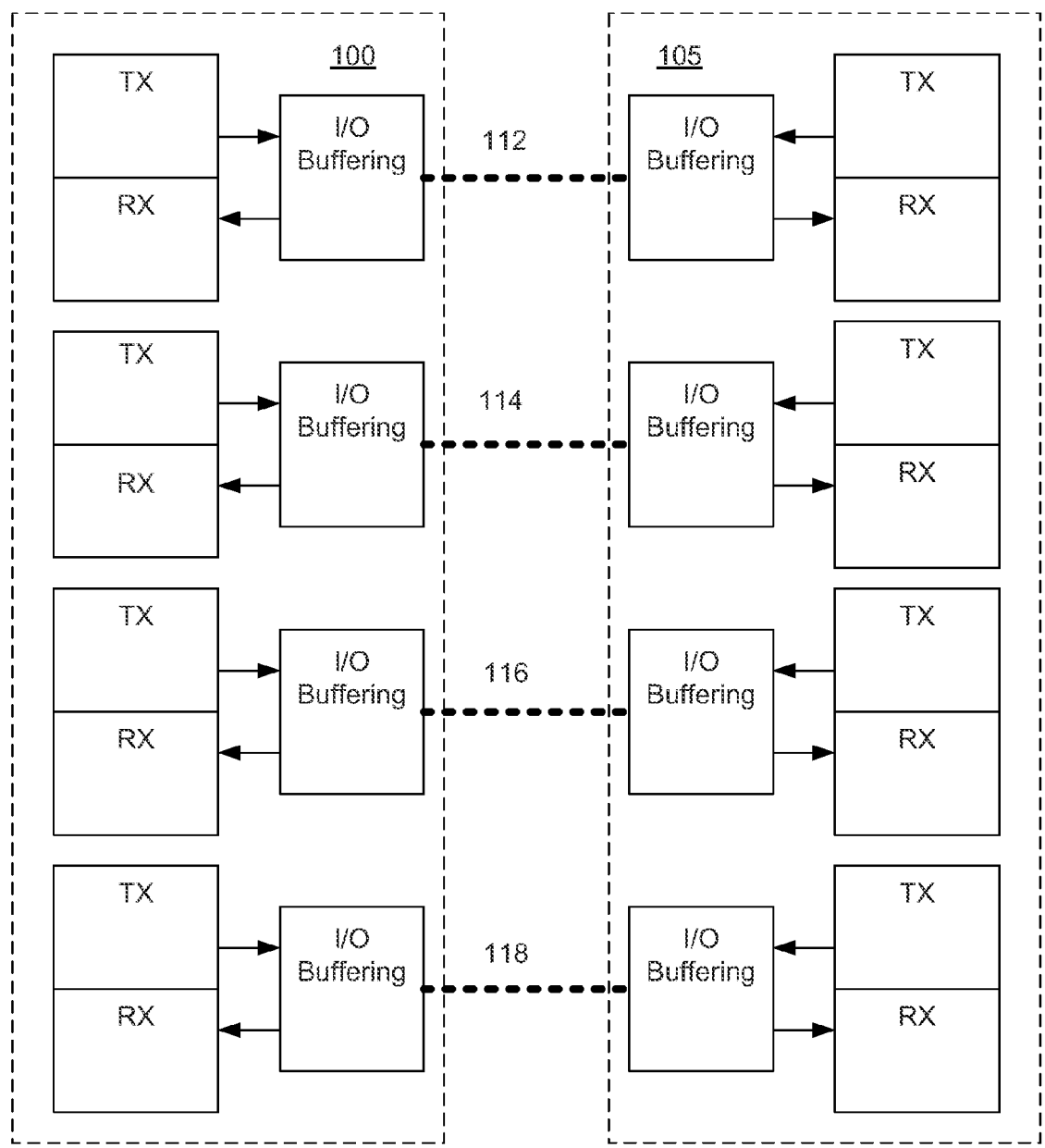
FIG. 1 shows a plurality of prior art Ethernet transceiver pairs.

As shown in the drawings for purposes of illustration, the invention is embodied in an apparatus and methods for reducing transmit signal components of a receive signal of a transceiver. Further, embodiments includes implementations of a transmit (TX) Digital to Analog Converter (DAC) and an echo cancellation DAC that include common control circuitry, thereby reducing distortion. Additionally, embodiments include circuit layout configurations that additionally reduce distortion. The descriptions provided are generally focused on Ethernet transceivers, but the described embodiments can be used in other configurations of transceivers as well. While the descriptions may generally include a transmit DAC and an echo cancellation DAC, it is to be understood that other implementations of DACs can accomplish equivalent functions of the transmit DAC and the echo cancellation DAC.

Figure 2:
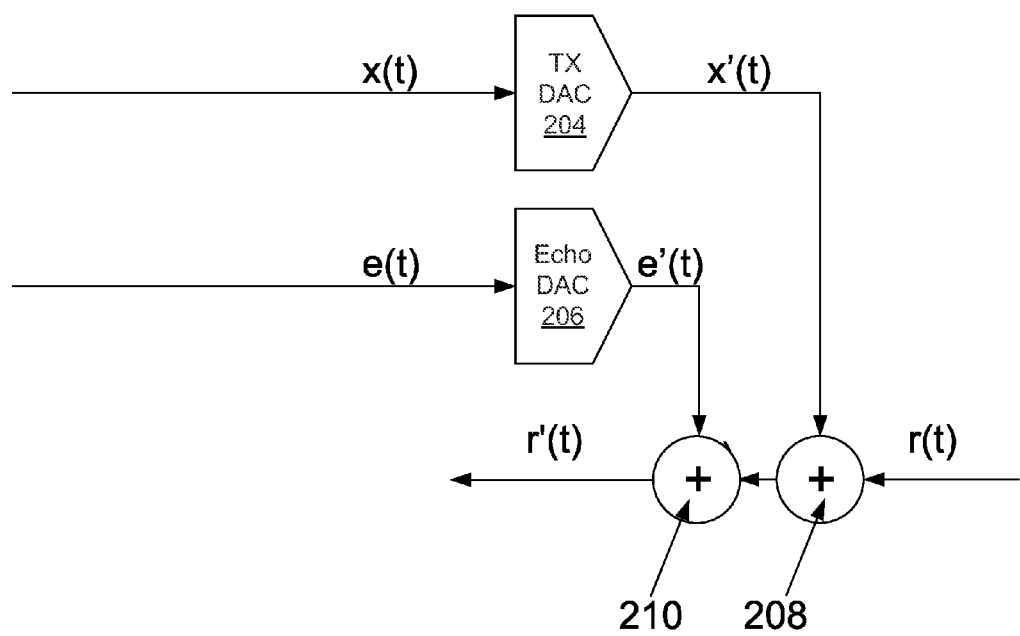
FIG. 2 shows a block diagram of one example of a transceiver that can utilizes methods of reducing transmit signal components of a receive signal of a transceiver.

An embodiment of a full duplex transceiver is shown in FIG. 2. As shown in FIG. 2, signal x(t) is the transmit signal, which is transmitted on, for example, an Ethernet cable. However, x(t) (designated as x'(t) after passing through the transmit DAC 204) is also injected in the receive signal path due to full duplex nature of the transmission, and hence added to the receive signal r(t). Signal e(t) is the echo signal that is generated from another (usually a replica) transmitter, and is subtracted from the received signal. The signal e(t) is approximately similar to the signal x(t) but not necessarily the same, because it may include additional terms such as processed versions of other cross talk signals, and other correction terms for the echo introduced by the termination circuitry. Embodiments include the Signal e'(t) (after passing through the echo cancellation DAC 206) being generated such that the resulting residual signal r'(t) is free of the transmit signal and possibly other impairments such as cross-talk. As shown, the post TXDAC x'(t) is combined with r(t) at summer 208, and e'(t) is combined (negatively) with the result at summer 210, resulting in r'(t), wherein echo (transmit signal components) have been canceled.

Since in general, the echo signal e'(t) can be different from the transmit signal x'(t), the distortion introduced by TXDAC 204 is not necessarily correlated with the distortion generated by the echo cancellation DAC 206. Hence for robust system performance both of these drivers have to be individually designed for very good linear performance (very low distortion), so as to not impact the overall system budget for acceptable distortion. This poses stringent requirements in terms of design, and impacts area and power of the overall solution.

Figure 3:
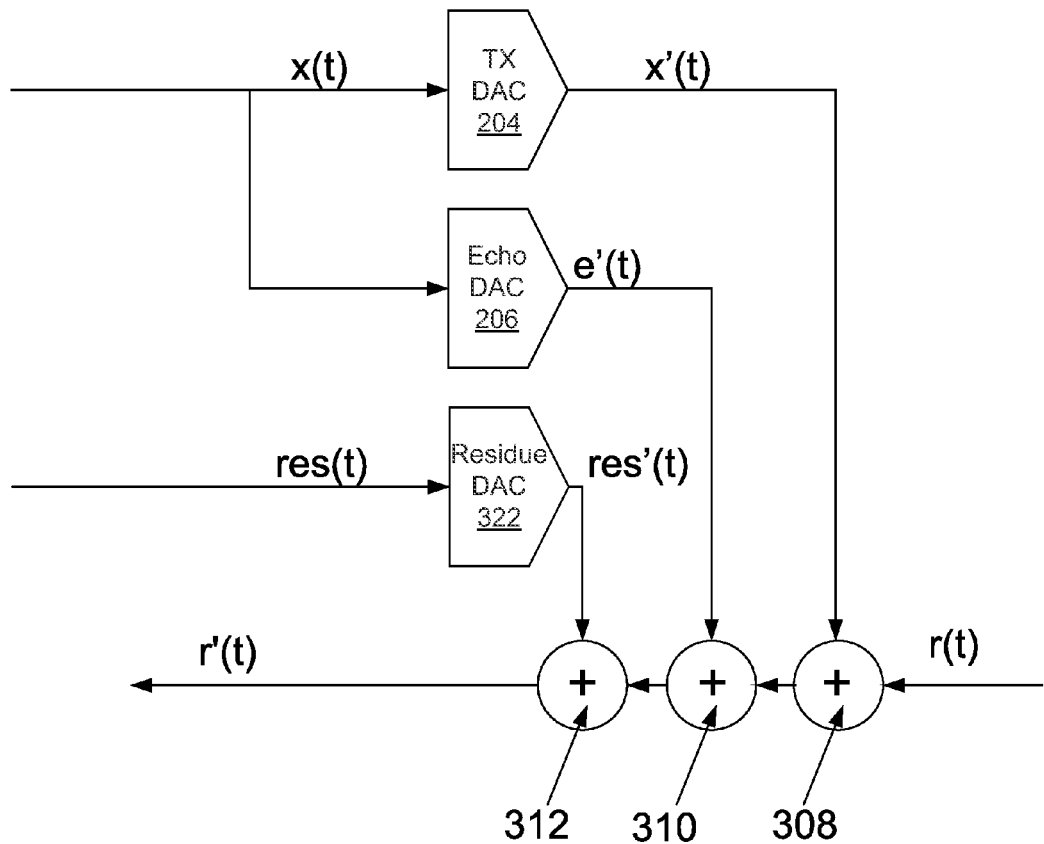
FIG. 3 shows a block diagram of another example of a transceiver that can utilize methods of reducing transmit signal components of a receive signal of a transceiver.

FIG. 3 shows a block diagram of another example of a transceiver that can utilize methods of reducing transmit signal components of a receive signal of a transceiver. This embodiment further includes a residue DAC 322 which results in improved distortion performance.

As noted, the echo signal e(t) is similar to TX signal x(t), but not necessarily identical. Hence, the non-linear distortion generated by the echo path is not correlated to the distortion generated by the TX path. Conceptually, this can be depicted by expressing the signal e(t) as a sum of two signals:

$$e(t)=\text{res}(t)+x(t)$$

Where:

$$\text{res}(t)=e(t)-x(t).$$

That is, the echo signal e(t) is decomposed as a sum of the original transmit signal x(t), and a residual signal res(t), which is only the difference of e(t) and x(t). Since e(t) is similar to x(t), the residual term res(t) is quite small. A third separate driver (Residual DAC 322) is additionally include in FIG. 3 to generate this additional term which can be subtracted at the input of the receiver (summer 312). Summation other signals x'(t), e'(t) with r(t) are depict by summers 308, 310.

As shown in FIG. 3, the input receive signal r(t) contains distortion contributions from three different drivers (204, 206, 322) as opposed to two (204, 206). However, this is an improvement over the embodiment of FIG. 2 for several reasons. First, the distortion generated by the TX DAC 204 is now highly correlated to EC DAC 206, because the input signals are the same (x(t)=e(t)). In one embodiment, these two drivers can be made completely identical, and hence the distortion generated by these paths will completely cancel. Second, the distortion generated by the third driver (Residue DAC 322) is negligible because the residual signal res(t) is much smaller than the signal x(t). Since the power of residual signal is small, the resultant distortion level generated by the Residue DAC 322 is quite negligible.

It can also be observed that the addition of the Residue DAC 322 also improves echo cancellation. In general, the composition of echo signal e(t) is designed so as to achieve maximum echo cancellation at the receiver input, and hence minimize the power of the signal coming at the input of the receiver. However, one constraint imposed on the composition of echo signal e(t) is the update rate of the signal in time domain, also referred to as the sampling rate of the echo signal. As suggested by the Nyquist sampling theorem, the maximum bandwidth of the signal e(t) can be no more than half of the sampling rate. That is, if the transmit symbol duration is $T_s$, then the transmission sampling rate $F_s$ can be defined as:

$$F_s=1/T_s$$

Then the maximum signal bandwidth of the echo signal is defined as:

$$F_{bw}=F_s/2$$

This constraint limits the amount of cancellation that can be achieved at the input of receiver. More specifically, any signals coming at the input of the receiver which are outside the maximum bandwidth of the echo signal e(t), will not be cancelled.

For the embodiment shown in FIG. 2, the way to overcome this problem is to increase the sampling rate of the echo signal e(t). However, this leads to increased power dissipation and increased area, which is undesirable. However, in the proposed embodiment shown in FIG. 3, the signal e(t) is decomposed into signals x(t) and res(t), with separate drivers. The driver Echo cancellation DAC 206 generates the signal x'(t) (x'(t)=e'(t)) which has the same signal bandwidth as the TX DAC 204, and does not need to run at higher sampling rate. But the sampling rate of the Residue DAC 322 can be increased to cancel additional terms that include high-frequency terms outside the maximum effectively controllable bandwidth of the Echo cancellation DAC 206. As mentioned earlier, the residual signal res(t) is much smaller than the signal x(t) or the signal e(t) shown in FIG. 2. Therefore, the area or power penalty of operating the Residue DAC 322 at a higher sampling rate is much smaller than operating the entire Echo cancellation DAC 206 (as shown in FIG. 2) at a high data rate.

In relation to the described embodiments, it is important to note that the inclusion of the residual DAC 322 allows for the TX DAC 204 and the Echo cancellation DAC 206 to share a common input signal x(t). The described embodiments can take advantage of this to achieve improved performance of the echo signal cancellation.

Figure 4:
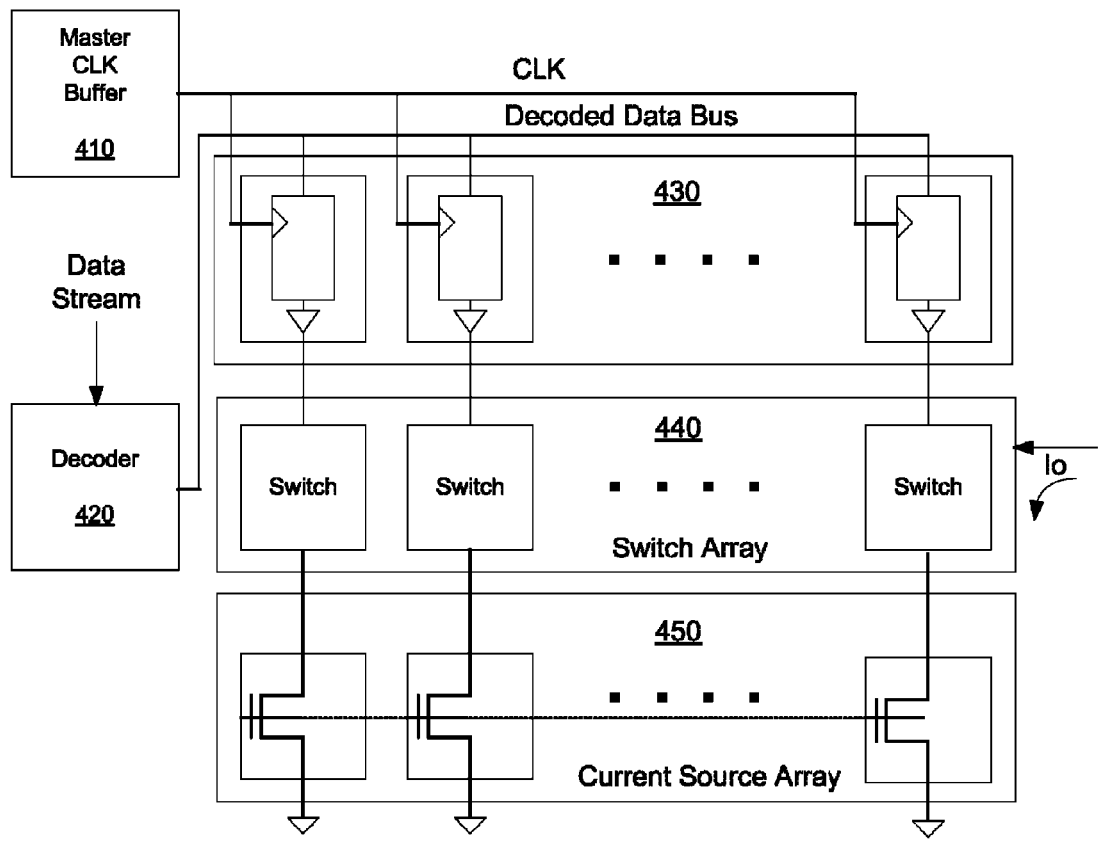
FIG. 4 shows a block diagram of an example of an embodiment of a digital to analog converter.

FIG. 4 shows a block diagram of an example of an embodiment of a digital to analog converter (DAC). The DAC shown in FIG. 4 can be used to implement the TX DAC and/or the echo cancellation DAC. Ideally, the distortion of the TX DAC and the echo cancellation DAC are the same, thereby allowing the distortion to be minimized (canceled) when the echo signal is summed with the transmit signal. Accordingly, an embodiment includes identical DAC implementation such as the exemplary embodiment shown in FIG. 4 being used for both the TX DAC and the echo cancellation DAC. Theoretically, this results in near-complete cancellation of the echo signal.

It should be noted, however, that the TX DAC is required to drive a line (cable), and therefore, is required to dissipate a large amount of power, and therefore, be physically large. The line impedance is typically low (50 ohms) leading to large power dissipation.

The exemplary DAC shown in FIG. 4 includes a data controller 430, a switch array 440 and a current source array 450. A decoder 420 receives a digital transmit signal stream and decodes the digital transmit signal stream and provides the decoded stream to the data controller 430. A master clock 410 clocks latches that are located within the data controller. While the data controller 430 is depicted as a separate unit, it is to be understood that embodiments of the data controller 430 additionally include all or parts of the functionality of, for example, the decoder 420 and the master clock 410.

The data controller 430 determines the settings of switches within the switch array 440, which in turns determines which of the current sources determine the output current (lo of the DAC). The output current of the DAC is shown as a single output. However, it is to be understood that a differential output could just as easily be shown and implemented. The differential output implementation merely requires switching current sources to sum at either the positive or negative terminals of the differential output.

As previously described, the TX DAC is required to drive a line (cable), and therefore, is required to dissipate a large amount of power, and be physically large. However, the Echo cancellation DAC only needs to generate a replica signal x(t) which does not need to drive the line impedance. Therefore, the Echo cancellation DAC can be a scaled down replica of the TXDAC. However, doing this makes the circuit design of Echo cancellation DAC different from the TXDAC, and can compromise the correlation between the distortion levels of TX DAC and Echo cancellation DAC. Embodiments includes circuit and circuit layout techniques that help achieve good correlation of distortion levels, while allowing scaling down of the Echo cancellation DAC.

The embodiment of a DAC of FIG. 4 includes the data controller 430, the switch array 440 and the current source array 450. In a traditional DAC, distortion arises from several different factors. Two key contributors to the distortion are non-uniformity in the current source array 450, and delays in the data controller 430.

For an embodiment, the DAC consists of identically scaled elements, which are turned on or off based on a digital input word (as provided by the decoder 420). It is extremely important that the current sources be fairly "identical" within the current source array 450. Any mismatches between the current sources lead to distortion. At high operating frequencies, the data controller 430 experiences dynamic voltage drops and supply bounce, which introduce signal dependent delay in the turning on & turning off for different current sources. This is a major source of distortion at high frequencies.

Figure 5:
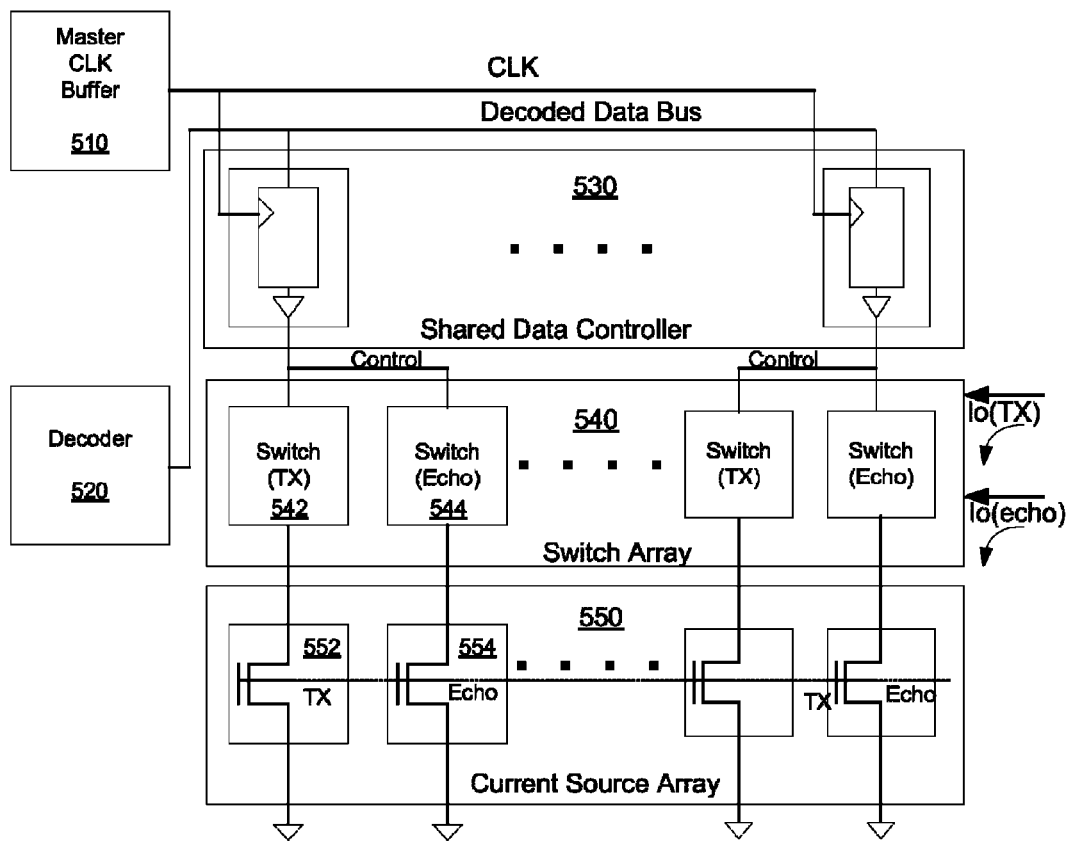
FIG. 5 shows a block diagram of an example of an embodiment of a transmit (TX) digital to analog (DAC) converter and an echo cancellation DAC that share data control circuitry.

FIG. 5 shows a block diagram of an example of an embodiment of a transmit (TX) digital to analog (DAC) converter and an echo cancellation DAC that share data control circuitry. The shared data controller 530 simultaneously controls TX switches and echo switches within a shared switch array 540. The TX switches and echo switches within the switch array 540 control which circuit elements are switched to contribute to the outputs lo(TX) and lo(echo). For an embodiment, at least one of the circuit elements includes a current source. For a more specific embodiment, at least one of the current sources includes a transistor generating a replica of a fixed current source.

In a conventional embodiment, the TX DAC and echo cancellation DAC are independently designed, trying to minimize the distortion components arising from these effects. The key aspect of the embodiment of FIG. 5 is the sharing of the data controller 530, which is implementable because the same data x(t) drives both the TX DAC and the echo cancellation DAC. Therefore, only the switch arrays 540 and the current source array 550 are separate. In a specific embodiment, the final output stage (echo switches and echo current sources) of echo cancellation DAC is scaled to be 1/5 of the TX DAC, thereby saving considerable area and power.

Sharing the drivers (data controller) makes sure that any data dependent modulation of the driving circuitry is highly correlated between the TX DAC and the echo cancellation DAC. This eliminates what is usually the most dominant source of distortion in high frequency DAC architectures. The common controller 530 minimizes the clock jitter difference between the TX signal and the echo signal which minimizes the jitter contribution to the outputs of the DACs. The common controller 530 additionally minimizes distortion at the receive input due to clock skew and fall/rise time effects. Additionally, the shared common controller 530 circuitry provides a reduction in area and power because less electronic circuitry is used.

For an embodiment, each transmit DAC switch and an associated echo cancellation DAC switch of the switch array 540 are synchronously controlled. For a more specific embodiment, a common control signal of the shared data controller 530 corresponds with a transmit DAC switch and an echo cancellation DAC switch. For a more specific embodiment, the shared data controller 530 includes a plurality of latches, wherein each latch corresponds with a transmit DAC switch and an echo cancellation DAC switch. For an embodiment, the plurality of latches are configured and clocked for re-synchronizing the transmit digital signal stream. A clock tree can be realized for clocking each of the plurality of latches from a common clock source.

As shown, each TX switch is proximately located near a corresponding echo switch within the switch array 540. For example, TX switch 542 is proximately located near echo switch 544. As shown, each TX current source is proximately located near a corresponding echo current source within the current source array 550. For example, TX current source 552 is proximately located near echo current source 554. Corresponding switches and current sources means switches and current sources that are commonly controlled by the shared data controller. By physically locating TX switches and echo switches that are commonly controlled close to each other, imperfections of the electrical devices due to fabrication or temperature variations have less of an influence on distortion of the signals generated by the DACs. The same is true of the TX and echo current sources.

An embodiment includes each echo cancellation DAC circuit element being physically located closest to the transmit DAC circuit element that is commonly controlled by the data controller than any other of the plurality of transmit DAC circuit elements. Additionally, an embodiment includes each echo cancellation DAC switch being physically located closest to the transmit DAC switch that is commonly controlled by the data controller than any other of the plurality of transmit DAC switches. A more specific embodiment includes each echo cancellation DAC circuit element being located between at least two sub-portions of the transmit DAC circuit element that is commonly controlled by the data controller.

Figure 6:
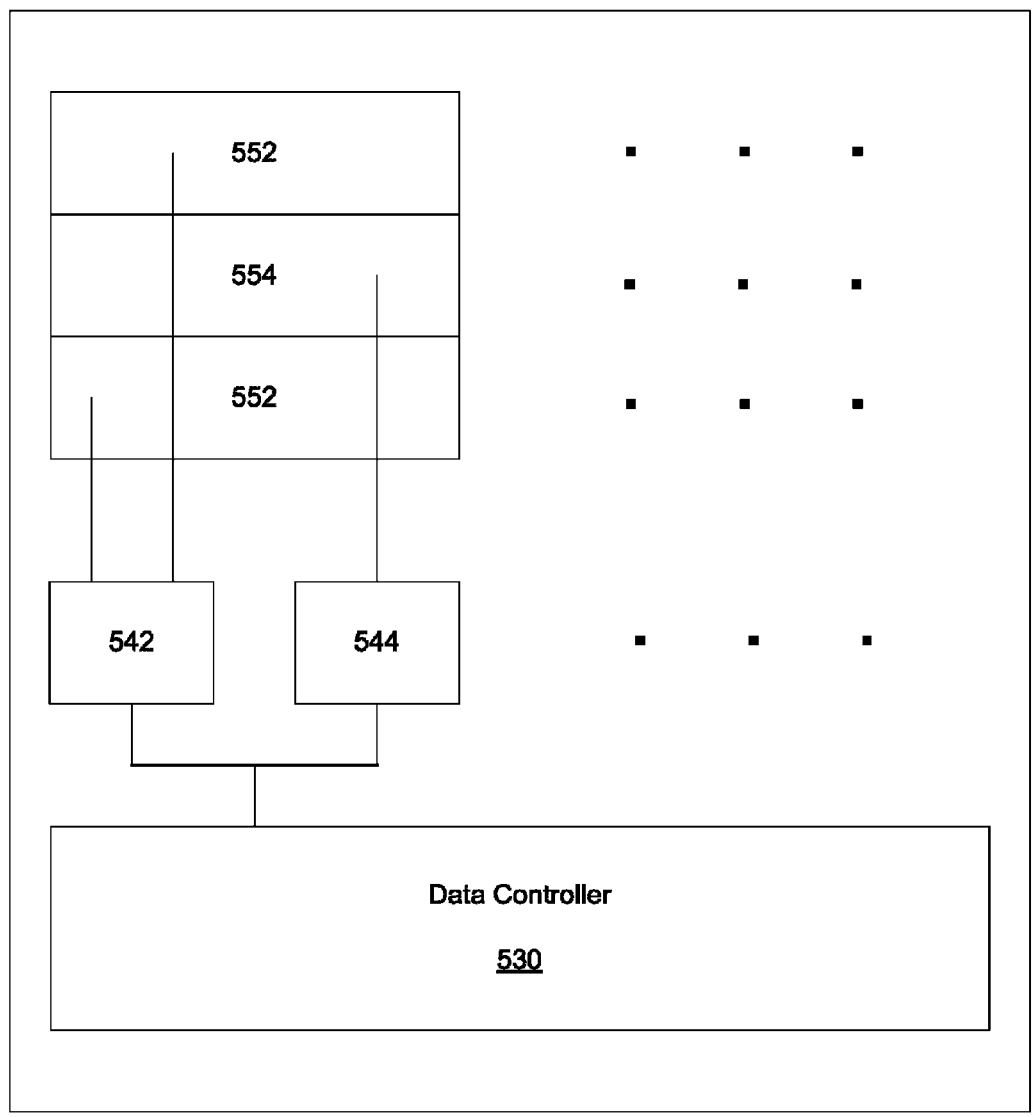
FIG. 6 shows an example of an integrated circuit floor plan that can include the described embodiments.

As previously described, the TX DAC is generally required to drive a heavier load than the echo cancellation DAC, and therefore, is generally required to be larger. An embodiment includes the echo cancellation DAC circuit elements being scaled-down replicas of the transmit DAC circuit elements, and the echo cancellation DAC switches being scaled-down replicas of the transmit DAC switches FIG. 6 shows an example of an integrated circuit floor plan that can include the described embodiments. As shown, an echo cancellation DAC circuit element 554 is physically located between at least two sub-portions of the transmit DAC circuit element 552 that is commonly controlled by the data controller 530 through TX switch 542 and echo switch 544.

Figure 7:
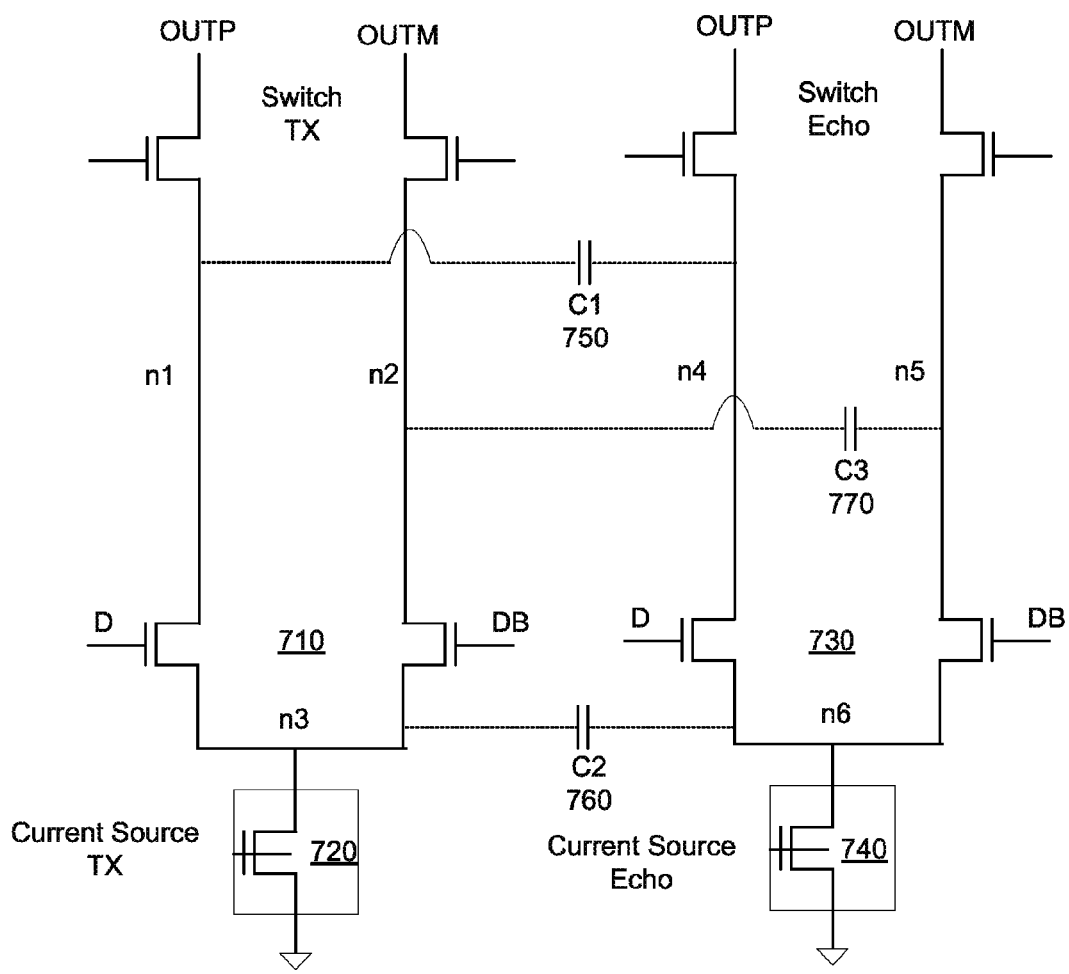
FIG. 7 shows a circuit diagram of an example of TX DAC current source, an echo cancellation DAC current source, a TX switch and an echo switches that include capacitive coupling between TX nodes and echo nodes.

FIG. 7 shows a circuit diagram of an example of TX DAC current source 720, an echo cancellation DAC current source 740, a TX switch 710 and an echo switch 730 that include capacitive coupling (for example, C1 750, C2 760 and C3) between TX nodes and echo nodes.

Parasitic capacitances of the switches 710, 730, and current sources 720, 740 limit the speed in which the current sources 720, 740 can be switched in and out. However, the capacitors C1 750, C2 760, and C3 770 provide "bootstrapping". That is, deliberate capacitive coupling is introduced between, for example, the nodes n1, n2 of TX DAC and the corresponding nodes n3, n4 of the echo cancellation DAC. The deliberate capacitance can be made possible because the layout is implemented, for example, in a single unit cell where the two circuits are in close proximity. By means of interconnect lines running side by side, some capacitance can be introduced. This makes the internal nodes of the TX DAC and the echo cancellation DAC highly correlated even at high frequencies. As a result, the non-linear distortion introduced by these circuits becomes highly correlated.

An embodiment includes capacitors connected between at least one internal node of at least one echo cancellation DAC switch and a corresponding transmit DAC switch. For embodiments, capacitance values of the capacitors are selected to be larger than values of parasitic capacitance associated with each echo cancellation DAC switch and corresponding transmit DAC switches. More specifically, capacitance values of the capacitors can be selected to ensure similar transient signal waveforms occur at internal electrical nodes of corresponding echo cancellation DAC and transmit DAC switches. These configuration can be particularly desirable when the echo cancellation DAC switches are scaled-down replicas of the transmit DAC switches because the transmit DAC switches are typically faster due to their larger size.

Additionally, embodiments includes capacitors connected between at least one internal node of at least one echo cancellation DAC circuit element and a corresponding transmit DAC circuit element. Embodiments include capacitance values of the capacitors being selected to be larger than values of parasitic capacitance associated with each echo cancellation DAC circuit element and corresponding transmit DAC circuit elements. More specifically, capacitance values of the capacitors can be selected to ensure similar transient signal waveforms occur at internal electrical nodes of corresponding echo cancellation DAC and transmit DAC circuit elements. Embodiments includes the echo cancellation DAC circuit elements being scaled-down replicas of the DAC circuit elements FIG. 8 is a flow chart that includes an example of steps of one method of a transceiver simultaneously transmitting a transmit signal and receiving a receive signal. A first step 810 includes a transmit DAC generating the transmit signal based on a transmit digital signal stream, the transmit DAC comprising a plurality of transmit DAC circuit elements, and a plurality of transmit DAC switches that control which of the plurality of transmit DAC circuit elements contribute to generating the transmit signal. A second step 820 includes an echo cancellation DAC generating an echo cancellation signal based on the transmit digital signal stream, the echo cancellation DAC comprising a plurality of echo cancellation DAC circuit elements, and a plurality of echo cancellation DAC switches that control which of the plurality of echo cancellation DAC circuit elements contribute to generating the echo cancellation signal. A third step 830 includes a data controller receiving the transmit digital signal stream, and controlling both the plurality of first DAC switches and the plurality of second DAC switches. A fourth step 840 includes cancelling at least a portion of the receive signal by summing the echo cancellation signal with the receive signal.

A Network of Devices

Figure 9:
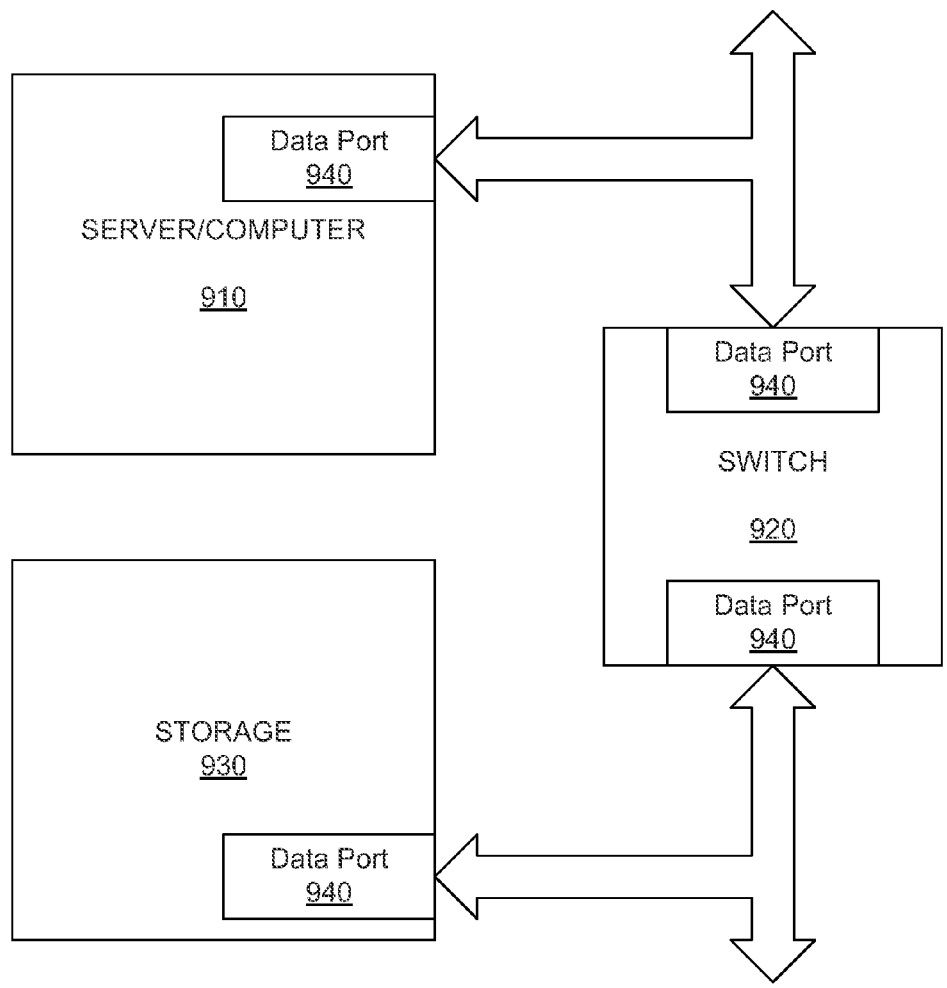
FIG. 9 shows devices connected to an Ethernet network that can include embodiments of reducing transmit signal components of a receive signal of a transceiver.

FIG. 9 shows devices connected to an Ethernet network that can include embodiments of reducing transmit signal components of a receive signal of a transceiver. The network includes a server/computer 910, a switch 920 and storage 930 that can all benefit from reducing transmit signal components of a receive signal of a transceiver 940. The server/computer 910 can be connected to the switch 920 through an Ethernet twisted pair LAN connection. The switch 920 can additionally be connected to the storage 930 through an Ethernet twisted pair LAN connection. The transceivers 940 within the server/computer 910, the switch 920, and the storage 930 can provide cancelation of transmit signal components of receive signals.

Although specific embodiments of the invention have been described and illustrated, the invention is not to be limited to the specific forms or arrangements of parts so described and illustrated. The invention is limited only by the appended claims.

What is claimed:

1. A transceiver that simultaneously transmits a transmit signal and receives a receive signal, comprising:

a transmit DAC generating the transmit signal based on a transmit digital signal stream, the transmit DAC comprising a plurality of transmit DAC circuit elements, and a plurality of transmit DAC switches that control which of the plurality of transmit DAC circuit elements contribute to generating the transmit signal;

an echo cancellation DAC generating an echo cancellation signal based on the transmit digital signal stream, the echo cancellation DAC comprising a plurality of echo cancellation DAC circuit elements, and a plurality of echo cancellation DAC switches that control which of the plurality of echo cancellation DAC circuit elements contribute to generating the echo cancellation signal;

a data controller that receives the transmit digital signal stream, and controls both the plurality of transmit DAC switches and the plurality of echo cancellation DAC switches; and a canceller for cancelling at least a portion of the receive signal by summing the echo cancellation signal with the receive signal.

2. The transceiver of claim 1, wherein each circuit element comprises a current source.

3. The transceiver of claim 2, wherein the current source comprises a transistor generating a replica of a fixed current source.

4. The transceiver of claim 1, wherein a transmit DAC switch and an associated echo cancellation DAC switch are synchronously controlled.

5. The transceiver of claim 1, wherein a common control signal of the data controller corresponds with a transmit DAC switch and an echo cancellation DAC switch.

6. The transceiver of claim 1, wherein the data controller comprises a plurality of latches, wherein each latch corresponds with a transmit DAC switch and an echo cancellation DAC switch.

7. The transceiver of claim 6, wherein the plurality of latches are configured and clocked for re-synchronizing the transmit digital signal stream.

8. The transceiver of claim 6, further comprising a clock tree for clocking each of the plurality of latches from a common clock source.

9. The transceiver of claim 1, wherein each echo cancellation DAC circuit element is physically located closest to the transmit DAC circuit element that is commonly controlled by the data controller than any other of the plurality of transmit DAC circuit elements.

10. The transceiver of claim 1, wherein each echo cancellation DAC switch is physically located closest to the transmit DAC switch that is commonly controlled by the data controller than any other of the plurality of transmit DAC switches.

11. The transceiver of claim 9, each echo cancellation DAC circuit element is located between at least two sub-portions of the transmit DAC circuit element that is commonly controlled by the data controller.

12. The transceiver of claim 1, wherein the echo cancellation DAC circuit elements are scaled-down replicas of the transmit DAC circuit elements.

13. The transceiver of claim 1, wherein the echo cancellation DAC switches are scaled-down replicas of the transmit DAC switches.

14. The transceiver of claim 1, further comprising capacitors connected between at least one internal node of at least one echo cancellation DAC switch and a corresponding transmit DAC switch.

15. The transceiver of claim 1, further comprising capacitors connected between at least one internal node of at least one echo cancellation DAC circuit element and a corresponding transmit DAC circuit element.

16. The transceiver of claim 14, wherein capacitance values of the capacitors are selected to be larger than values of parasitic capacitance associated with each echo cancellation DAC switch and corresponding transmit DAC switches.

17. The transceiver of claim 14, wherein capacitance values of the capacitors are selected to ensure similar transient signal waveforms occur at internal electrical nodes of corresponding echo cancellation DAC and transmit DAC switches.

18. The transceiver of claim 17, wherein the echo cancellation DAC switches are scaled-down replicas of the transmit DAC switches.

19. The transceiver of claim 15, wherein capacitance values of the capacitors are selected to be larger than values of parasitic capacitance associated with each echo cancellation DAC circuit element and corresponding transmit DAC circuit elements.

20. The transceiver of claim 15, wherein capacitance values of the capacitors are selected to ensure similar transient signal waveforms occur at internal electrical nodes of corresponding echo cancellation DAC and transmit DAC circuit elements.

21. The transceiver of claim 20, wherein the echo cancellation DAC circuit elements are scaled-down replicas of the DAC circuit elements.

22. A method of a transceiver simultaneously transmitting a transmit signal and receiving a receive signal, comprising:

generating the transmit signal, with a first DAC, based on a transmit digital signal stream, the first DAC comprising a plurality of first DAC circuit elements, and a plurality of first DAC switches that control which of the plurality of first DAC circuit elements contribute to generating the transmit signal;

generating an echo cancellation signal, with a second DAC, based on the transmit digital signal stream, the second DAC comprising a plurality of second DAC circuit elements, and a plurality of second DAC switches that control which of the plurality of second DAC circuit elements contribute to generating the echo cancellation signal;

a data controller receiving the transmit digital signal stream, and controlling both the plurality of first DAC switches and the plurality of second DAC switches; and cancelling at least a portion of the receive signal by summing the echo cancellation signal with the receive signal.

23. The method of claim 22, further comprising synchronously controlling a first DAC switch and an associated second DAC switch.

24. The method of claim 22, further comprising physically locating each second DAC circuit element closest to the first DAC circuit element that is commonly controlled by the data controller than any other of the plurality of first DAC circuit elements.

25. The method of claim 22, further comprising physically locating each second DAC switch closest to the first DAC switch that is commonly controlled by the data controller than any other of the plurality of first DAC switches.

26. The method of claim 22, further comprising bootstrapping with a coupling device at least one internal node of at least one echo cancellation DAC switch and a corresponding transmit DAC switch.

* * * * *